United States Patent [19]

Tokiwa et al.

[11] Patent Number: 5,401,778
[45] Date of Patent: Mar. 28, 1995

[54] BIODEGRADABLE PLASTIC COMPOSITION AND BIODEGRADABLE PLASTIC SHAPED BODY

[75] Inventors: Yutaka Tokiwa; Akira Iwamoto, both of Tsukuba; Masahiro Harada, Hiratsuka; Shigeki Imagawa, Niigata; Teizi Urakami, Tokyo, all of Japan

[73] Assignees: Director-General of Agency of Industrial Science and Technology; Mitsubishi Gas Chemical Co., Ltd., both of Japan

[21] Appl. No.: 44,386

[22] Filed: Apr. 7, 1993

[30] Foreign Application Priority Data

Apr. 14, 1992 [JP] Japan .................................. 4-121197
Apr. 14, 1992 [JP] Japan .................................. 4-121198

[51] Int. Cl.$^6$ ...................... C08G 63/06; C08G 63/08; C08L 67/04
[52] U.S. Cl. .................... 523/124; 523/125; 525/411; 525/450; 525/415
[58] Field of Search ................ 523/124, 125; 525/411, 525/415, 450

[56] References Cited

U.S. PATENT DOCUMENTS 5,124,371 6/1992 Tokiwa et al. ..................... 523/124

FOREIGN PATENT DOCUMENTS 0534471 3/1993 European Pat. Off. .

OTHER PUBLICATIONS

Polymer Degradation & Stability, vol. 36, No. 3, 1992.
Other References Biomaterials, vol. 13, No. 1, Jan. 1992, pp. 9–16.

*Primary Examiner*—Paul R. Michl
*Assistant Examiner*—Andrew E. C. Merriam
*Attorney, Agent, or Firm*—Lorusso & Loud

[57] ABSTRACT

A biodegradable plastic composition for forming biodegradable shaped bodies which includes a poly-$\beta$-hydroxybutyrate having a viscosity of $n_A$ at 185° C. and a polycaprolactone having a viscosity of $n_B$ at 185° C., wherein the poly-$\beta$-hydroxybutyrate is present in an amount $C_A$ of 10–45 or 55–85% by weight based on the total weight of the poly-$\beta$-hydroxybutyrate and the polycaprolactone, and wherein $n_A$, $n_B$ and $C_A$ satisfy the following condition:

$$4 \times 10^{-3} \times C_A - 1.7 \leq \log(n_A/n_B) \leq 4 \times 10^{-3} \times C_A - 1.3.$$

5 Claims, 1 Drawing Sheet

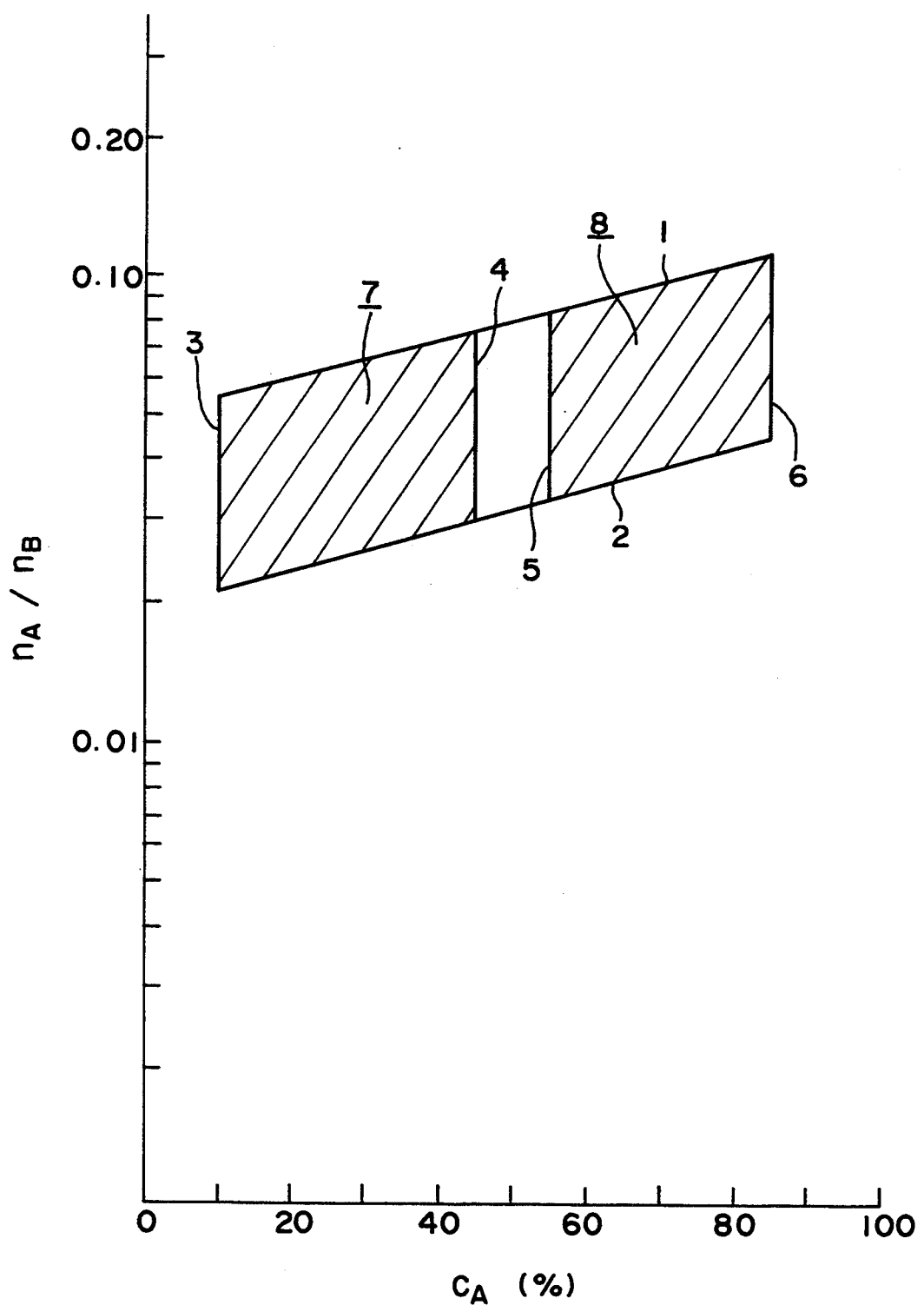

BIODEGRADABLE PLASTIC COMPOSITION AND BIODEGRADABLE PLASTIC SHAPED BODY

BACKGROUND OF THE INVENTION

1. Field of the Invention

This invention relates to a biodegradable plastic composition and a biodegradable plastic shaped body formed of such a composition.

2. Description of Prior Art

To cope with increasing problems of environmental pollution by plastic wastes, various studies have been and are still intensively made on plastic shaped bodies which are degradable or disintegrable upon being placed in an environment where microorganisms can grow. From the stand point of preventive pollution, it is highly desirable that a plastic shaped body be completely biodegradable.

Polycaprolactone (hereinafter referred to as PCL for brevity) is known to be biodegradable. However, PCL is low in modulus of elasticity and is poor in thermal resistance, though the impact strength thereof is excellent. Poly-β-hydroxy-butyrate (hereinafter referred to as PHB for brevity) is also known to be biodegradable. However, PHB is difficult to mold and low in impact strength, though the tensile and bending strengths and the modulus of elasticity thereof are high. Thus, PCL and PHB have not yet been widely utilized for biodegradable shaped bodies.

Japanese Published Unexamined Patent Application No. H3-157450 (equivalent to U.S. Pat. No. 5,124,371) discloses a biodegradable plastic composition including a blend of PCL and PHB. While this prior art composition exhibits good biodegradability, it has been found that the mechanical properties thereof are not fully satisfactory. In particular, it has been found that when PCL and PHB are used in the same amount according to the working example of this prior art, variation in mechanical properties and appearance is seen between respective shaped bodies as well as in each of the shaped bodies. This is considered to be attributed to difficulty in obtaining a homogeneous mixture of PHB and PCL. To overcome the difficulty, this prior art suggests the use of a PHB-PCL copolymer which serves to improve compatibility between PHB and PCL.

While the use of such a copolymer can improve the compatibility, another problem is caused because it is difficult to control the content of the copolymer and the properties of the shaped product obtained from the composition and because the copolymerization catalyst unavoidably remains in the composition. Further, the presence of the copolymer causes a reduction of the crystallization rate of a melt of the composition so that, in the molding of the melt, a relatively long cooling time is required for completing the crystallization. Moreover, the copolymer adversely affects the gas barrier property of the molded product because the crystallinity thereof is lowered.

SUMMARY OF THE INVENTION

The present invention provides a biodegradable plastic composition which includes a poly-β-hydroxybutyrate showing a viscosity of $n_A$ at 185° C. and a polycaprolactone showing a viscosity of $n_B$ at 185° C., wherein the poly-β-hydroxybutyrate is present in an amount of $C_A$ % by weight based on the total weight of the poly-β-hydroxybutyrate and the polycaprolactone and wherein $C_A$, $n_A$ and $n_B$ satisfy the following conditions (a) and (b):

$$10 \leq C_A \leq 45 \text{ or } 55 \leq C_A \leq 85 \tag{a}$$

$$4 \times 10^{-3} \times C_A - 1.7 \leq \log(n_A/n_B) \leq 4 \times 10^{-3} \times C_A - 1.3. \tag{b}$$

The present invention also provides a biodegradable plastic shaped body formed of the above composition.

It has been unexpectedly found that when PHB and PCL are used such that the amount of one of the two components is larger than that of the other, the smaller amount component is homogeneously dispersed in a matrix of the larger amount component without resorting to the use of a PHB-PCL copolymer.

It is an object of the present invention to provide a biodegradable composition which gives a homogeneous melt suitable for forming, such as by extrusion, shaped bodies with uniform mechanical properties.

Another object of the present invention is to provide a biodegradable shaped body having a uniform, beautiful surface appearance and excellent mechanical properties.

BRIEF DESCRIPTION OF THE DRAWINGS

Other objects, features and advantages of the present invention will become apparent from the detailed description of the preferred embodiments of the invention which follows, when considered in light of the accompanying drawing in which:

the sole FIGURE is a diagram showing the relationship between the content of PHB and the viscosity ratio $n_A/n_B$ on a logarithmic scale.

DETAILED DESCRIPTION OF THE PREFERRED EMBODIMENTS OF THE INVENTION

In the present invention PHB and PCL are conjointly used. Both chemically and biologically prepared PHB may be used for the purpose of the present invention. Commercially available PHB showing a viscosity of at least 500 P (poise) at 185° C. is generally used. PCL is a polyester obtained by, for example, ring open addition polymerization of caprolactone or polycondensation of a hydroxycarboxylic acid or an ester thereof. Commercially available PCL is suitably used for the purpose of the present invention.

It is important that PHB should be used in an amount of 10–45% by weight or 55–85% by weight based on the total weight of PHB and PCL. An amount of PHB of less than 10% by weight is disadvantageous because thermal resistance of the composition is unsatisfactory. Too large an amount of PHB in excess of 85% by weight, on the other hand, causes reduction in impact resistance and elongation. Further, when the amount of PHB is greater than 45% by weight but smaller than 55% by weight, the molten mixture of PHB and PCL is not homogeneous so that it is difficult to prepare a shaped body which is uniform in mechanical properties and appearance. Further, there is caused a dispersion in mechanical properties between resulting shaped bodies. Probably, such heterogeneity in the molten state would be caused by phenomenon that both PHB and PCL competitively form a continuous matrix phase or a dispersed, discontinuous phase. The amount of PHB is preferably 20–45% by weight or 55–80% by weight, more preferably 30–45% by weight or 55–75% by weight.

It is also important that the following condition be met:

$$4\times 10^{-3}\times C_A - 1.7 \leq \log(n_A/n_B) \leq 4\times 10^{-3}\times C_A - 1.3.$$

wherein $C_A$ represents an amount of PHB in terms of % by weight based on the total weight of PHB and PCL, $n_A$ represents the viscosity of PHB in a molten state at 185° C. and $n_B$ represents the viscosity of PCL in a molten state at 185° C.

The above-described conditions are illustrated in the FIGURE in which the reference numerals 1 and 2 indicate lines of the following formulas (1) and (2), respectively:

$$\log(n_A/n_B) = 4\times 10^{-3}\times C_A - 1.3 \quad (1)$$

$$\log(n_A/n_B) = 4\times 10^{-3}\times C_A - 1.7 \quad (2)$$

The lines 3–6 represent $C_A$ of 10, 45, 55 and 85, respectively. Thus, the composition of the present invention should be within the range represented by two shaded portions 7 and 8.

When the viscosity ratio $n_A/n_B$ and the amount of PHB are outside the above-specified range, a molten mixture of PHB and PCL is not homogeneous so that shaped bodies obtained therefrom fail to exhibit uniform appearance and satisfactory mechanical properties.

The above composition may further contain various conventionally employed additives such as a colorant, a plasticizer, a filler, a crystal nucleus agent and an oxidation inhibitor.

The biodegradable composition of the present invention does not require a compatibility improving agent such as a copolymer of PHB and PCL. Without such an agent, the molten mixture of PHB and PCL according to the present invention is homogeneous and has excellent moldability so that the resulting shaped bodies show high mechanical strengths, thermal resistance and gas-barrier properties in addition to excellent biodegradability.

Thus, the composition according to the present invention can be used for the production of various biodegradable shaped bodies and moldings by any method conventionally adopted in molding of known thermoplastic resins, such as by injection molding, injection blow molding, injection stretching blow molding, extrusion, extrusion blow molding, extrusion stretching blow molding, stretching, rolling, thermoforming, spinning or spinning with drawing. The shaped bodies may be in the form of, for example, a film, sheet, pipe, bottle, receptacle, tube, rod, pellet, monofilament, fiber, woven or non-woven fabric, block or plate and may be applied to various utilizations such as mechanical parts, parts of sporting goods, medical tools, receptacles for foods, drugs and cosmetics, bags for refuse, packaging materials, fishing lines and nets, ropes, clothes, and materials for industrial or agricultural uses.

The following examples will further illustrate the present invention. Parts are by weight. The viscosity, melting point, tensile and impact test are performed as follows:

Viscosity

Apparatus: Capillary Rheometer (FLOW TESTER CFT-500 manufactured by Shimadzu Seisakusho Ltd.)
Capillary diameter: 1 mm, length: 10 mm
Temperature: 185° C.
Pressure: 10 kg/cm$^2$

Melting Point

Heat absorption peak attributed to the melting of the crystal in DSC curve represents the melting point.
Apparatus: DSC Analyzer (SSC/560 manufactured by Seiko Electric Industry Co., Ltd.)
Temperature Increasing Rate: 10° C./minute

Tensile Test

1) Film Sample Formed by Extrusion through T-Die
Apparatus: Tensile Tester (TENSILON UTH-III manufactured by Orientec Inc.)
Chuck Span: 50 mm
Drawing Rate: 50 mm/minute
Temperature: 23° C.
Relative Humidity: 50%
2) Dumbbell Sample Formed by Injection Molding
Apparatus: Tensile Tester (MINI MAX TENSILE TESTER CS-183TI manufactured by Custom Scientific Instruments Inc.)
Chuck Span: 8 mm
Drawing Rate: 0.233 inch/minute
Temperature: 23° C.
Relative Humidity: 50%

Impact Test

Apparatus: Izod Impact Tester (MINI MAX IMPACT TESTER CS-183 TI manufactured by Custom Scientific Instruments Inc.)
Temperature: 23° C.
Relative Humidity: 50%

EXAMPLE 1

PHB (20 parts, melting point: 171° C., viscosity: 1,100 P at 185° C.) was mixed with PCL (80 parts, PLACSEL-H7 manufactured by Daicel Inc., melting point: 61° C., viscosity: 26,000 P at 185° C.) and the mixture was extruded through a T-die of an extruder (LABO-PLASTOMIL manufactured by Toyo Seiki K. K., screw diameter: 20 mm, cylinder temperature: 170°–185° C., die temperature: 185° C.) while evaluating moldability in terms of stability of extrusion and formation of foams. The extrudate was passed through cool rollers at 20° C. to obtain a sheet having a thickness of about 250 μm. Sample tapes each having a length of 100 mm and a width of 10 mm were cut out from the sheet and were used for tensile tests. The results are summarized in Table 1 below.

EXAMPLE 2

Example 1 was repeated in the same manner as described except that the weight ratio of PHB to PCL was changed from 20/80 to 40/60. The results are shown in Table 1.

Comparative Example 1

Example 1 was repeated in the same manner as described except that PCL having a melting point of 61° C. and a viscosity of 640 P (PLACSEL-H4 manufactured by Daicel Inc.) was used in lieu of PLACSEL-H7. The results are shown in Table 1.

Comparative Example 2

Example 2 was repeated in the same manner as described except that PCL having a melting point of 61°

C. and a viscosity of 640 P (PLACSEL-H4 manufactured by Daicel Inc.) was used in lieu of PLACSEL-H7. The results are shown in Table 1.

Comparative Example 3

Example 1 was repeated in the same manner as described except that the weight ratio of PHB to PCL was changed from 20/80 to 50/50. Extrusion was not able to be performed in a stable manner so that it was difficult to obtain a sheet with a uniform thickness. Thus, there were differences in results (values of the tensile strength and elongation) of the tensile tests between sample tapes. This suggests that a molten admixture of PHB and PCL is not homogeneous when the two components are present in the same amount.

Comparative Example 4

Example 1 was repeated in the same manner as described except that no PCL was used. The results are shown in Table 1.

Comparative Example 5

Example 1 was repeated in the same manner as described except that no PHB was used. The results are shown in Table 1.

Comparative Example 6

Comparative Example 1 was repeated in the same manner as described except that no PHB was used. The results are shown in Table 1.

EXAMPLE 4

Example 3 was repeated in the same manner as described except that the weight ratio of PHB to PCL was changed from 80/20 to 60/40. The results are shown in Table 2.

Comparative Example 7

Example 4 was repeated in the same manner as described except that PCL having a melting point of 61° C. and a viscosity of 2800 P (PCL-P767 manufactured by Union Carbide Corp.) was used in lieu of PCL-P787. The results are shown in Table 1.

Comparative Example 8

Example 3 was repeated in the same manner as described except that the weight ratio of PHB to PCL was changed from 80/20 to 50/50. Extrusion was not able to be performed in a stable manner so that it was difficult to obtain an extruded strand with a uniform diameter. Further, there were differences in results (values of the tensile strength and elongation) of the tensile tests between sample dumbbells and bars. This suggests that a molten admixture of PHB and PCL is not homogeneous when the two components are present in the same amount.

Comparative Example 9

Example 3 was repeated in the same manner as described except that no PCL was used. The results are shown in Table 2.

TABLE 1

| Example No. | Weight Ratio PHB/PCL | Viscosity Ratio PHB/PCL | Moldability Stability | Moldability Foam | Tensile Strength (*) (MPa) | Elongation (%) | Modulus (GPa) |
| --- | --- | --- | --- | --- | --- | --- | --- |
| 1 | 20/80 | ca. 1/24 | good | none | 28.0 (5) | >500 | 0.60 |
| 2 | 40/60 | ca. 1/24 | good | none | 22.4 (7) | >500 | 0.85 |
| Comptv. 1 | 20/80 | ca. 1/0.6 | no good | none | 14.0 (15) | 205 | 0.40 |
| Comptv. 2 | 40/60 | ca. 1/0.6 | no good | none | 14.8 (13) | 6.4 | 0.54 |
| Comptv. 3 | 50/50 | ca. 1/24 | no good | none | 16.9 (28) | 173 | |
| Comptv. 4 | 100/0 | — | good | detected | 21 | 6 | 1.20 |
| Comptv. 5 | 0/100 | — | good | none | 20 | >500 | 0.31 |
| Comptv. 6 | 0/100 | — | good | none | 19 | >500 | 0.27 |

*: Coefficient of variation (V) in tensile strength of similar samples calculated from the following equation:
V = (standard variation/average) × 100%

EXAMPLE 3

PHB (80 parts, melting point: 171° C., viscosity: 1,100 P at 185° C.) was mixed with PCL (20 parts, PCL-P787 manufactured by Union Carbide Corp., melting point: 61° C., viscosity: 24,000 P at 185° C.) and the mixture was extruded and cut into pellets. The pellets were charged into an injection molding machine (MINIMAX MOLDER CS-183MMX manufactured by Custom scientific Instrument Inc.) and subjected to injection molding at a cylinder temperature of 185° C. and a mold temperature of 50°–55° C. to form dumbbells and rectangular bars. The dumbbell had an intermediate portion having a diameter of 1.6 mm and a length of 8 mm and two opposite large diameter portions each having a diameter of 4.5 mm and a length of 4.5 mm. The bar had a square cross section (3.2 mm × 3.2 mm) and a length of 6.22 mm. The bar had a notch having a depth of 0.142 mm. The molded products were then tested for their mechanical properties to give the results shown in Table 2.

shown in Table 2.

Comparative Example 10

Example 3 was repeated in the same manner as described except that no PHB was used. The results are shown in Table 2.

Comparative Example 11

Comparative Example 7 was repeated in the same manner as described except that no PHB was used. The results are shown in Table 2.

Example 5

PHB (80 parts, melting point: 171°C., viscosity: 1,100 P at 185° C.) was mixed with PCL (20 parts, PLACSEL-H7 manufactured by Daicel Inc., melting point: 61° C., viscosity: 26,000 P at 185° C.) and the mixture was extruded through a T-die of an extruder (LABOPLASTOMIL manufactured by Toyo Seiki K. K., screw diameter: 20 mm, cylinder temperature: 170°–185° C., die temperature: 185° C.) while evaluating moldability in terms of stability of extrusion and formation of foams. The extrudate was passed through cool rollers at 20°–55° C. to obtain a sheet having a thickness of about 250 μm. Sample tapes each having a length of 100 mm and a width of 10 mm were cut out from the sheet and were used for tensile tests. The results are summarized in Table 2 below.

TABLE 2

| Example No. | Weight Ratio PHB/PCL | Viscosity Ratio PHB/PCL | Moldability Stability | Moldability Foam | Tensile Strength (MPa) | Elongation (%) | Impact Strength (J/m) |
| --- | --- | --- | --- | --- | --- | --- | --- |
| 3 | 80/20 | ca. 1/22 | good | none | 23 | 27 (7)* | 14 |
| 4 | 60/40 | ca. 1/22 | good | none | 22 | 30 (9)* | 15 |
| Comptv. 7 | 60/40 | ca. 1/2.5 | no good | none | 15 | 12 (14)* | 10 |
| Comptv. 8 | 50/50 | ca. 1/22 | no good | none |  | 28 (25)* |  |
| Comptv. 9 | 100/0 | — | good | detected | 22 | 11 | 10 |
| Comptv. 10 | 0/100 | — | good | none | 18 | 390 | — |
| Comptv. 11 | 0/100 | — | good | none | 17 | 380 | — |
| 5 | 80/20 | ca. 1/24 | good | none | 21 | 10 | — |
| Comptv. 12 | 80/20 | ca. 1/0.6 | no good | none | 17 | 5 | — |
| Comptv. 13 | 100/0 | — | good | detected | 21 | 6 | — |

*: Coefficient of variation (V) in elongaton of similar samples calculated from the following equation:
V = (standard variation/average) × 100%

Comparative Example 12

Example 5 was repeated in the same manner as described except that PCL having a melting point of 61° C. and a viscosity of 640 P (PLACSEL-H4 manufactured by Daicel Inc.) was used in lieu of PLACSEL-H7. The results are shown in Table 2 above.

Comparative Example 13

Example 5 was repeated in the same manner as described except that no PCL was used. The results are shown in Table 2.

From the results shown in Tables 1 and 2, it will be appreciated that conjoint use of PHB and PCL does not give an improvement in mechanical properties when the viscosity ratio of PHB to PCL is outside the specified range. Further, as shown in Comparative Examples 3 and 8, good results cannot be obtained when the weight ratio of PHB to PCL is 1:1 even though the viscosity ratio falls within the scope of the specified range.

Example 6

PHB (30 parts, melting point: 171° C., viscosity: 1,100 P at 185° C.) was mixed with PCL (70 parts, PLACSEL-H7 manufactured by Daicel Inc., melting point: 61° C., viscosity: 26,000 P at 185° C.) and the mixture was subjected to blow molding using in combination an extruder (screw diameter: 40 mm), a cylindrical die and a mold (for 500 ml bottle) at an extrusion temperature of 175°–180° C. and a die temperature of 25° C. and a mold temperature of 25° C., thereby to obtain a bottle having an inside volume of 500 ml and a surface area of 0.042 m².

The thus molded bottle was then checked to evaluate moldability and further tested for its shape retentivity, oxygen permeability and biodegradability. The results are summarized in Table 3. The test methods are as follows:

Moldability

Whether or not the resin is able to be molded into a bottle is checked. The molded bottle is tested for the adhesion at the pinch-off portion in the bottom thereof. Evaluation of moldability is rated as follows:

good: Blow molding can be made and adhesion at the pinch-off off portion of the molded bottle is excellent poor: Molding cannot be effected or adhesion at the pinch-off portion of the molded bottle is unsatisfactory

Shape Retentivity

Sample is placed for 30 minutes in an air recirculating chamber maintained at a constant temperature. The maximum temperature below which the sample is not deformed is measured. Thus, the higher the maximum temperature, the better is the shape retentivity.

Biodegradability

Sample is buried in the soil for 12 months. The weight loss is calculated as follows: Weight Loss (%)=(W$_0$−W$_1$)/W$_0$×100

Example 7

Example 6 was repeated in the same manner as described except that the weight ratio of PHB to PCL was changed from 30/70 to 40/60. The results are shown in Table 3.

Example 8

Example 6 was repeated in the same manner as described except that the weight ratio of PHB to PCL was changed from 30/70 to 60/40. The results are shown in Table 3.

Comparative Example 14

Example 6 was repeated in the same manner as described except that no PCL was used. However, because of insufficient bonding at the lower, pinch-off portion of the parison, an air tight bottle was not able to be obtained.

Comparative Example 15

Example 6 was repeated in the same manner as described except that no PHB was used° The results are shown in Table 3.

Comparative Example 16

Example 6 was repeated in the same manner as described except that the weight ratio of PHB to PCL was changed from 30/70 to 50/50. The results are shown in Table 3.

TABLE 3

| Example No. | Weight Ratio PHB/PCL | Viscosity Ratio PHB/PCL | Moldability | Shape Retentivity (C) | Average Thickness (mm) | Oxygen Permeability (*) | Biodegradability (%) |
| --- | --- | --- | --- | --- | --- | --- | --- |
| 6 | 30/70 | ca. 1/24 | good | 85 | 1.0 | 1.00 | 38 |
| 7 | 40/60 | ca. 1/24 | good | 95 | 1.0 | 0.62 | 36 |
| 8 | 60/40 | ca. 1/24 | good | 115 | 1.1 | 0.36 | 35 |
| Comptv. 14 | 100/0 | — | poor | — | — | — | — |
| Comptv. 15 | 0/100 | — | good | 60 | 1.0 | 3.70 | 40 |
| Comptv. 16 | 50/50 | ca. 1/24 | poor | — | — | — | — |

*: cc/bottle day atm

What is claimed is:

1. A biodegradable plastic composition consisting essentially of a poly-β-hydroxybutyrate having a viscosity of $n_A$ at 185° C. and a polycaprolactone having a viscosity of $n_B$ at 185° C., said poly-β-hydroxybutyrate being present in an amount of $C_A$ % by weight based on the total weight of said poly-β-hydroxybutyrate and said polycaprolactone, wherein $C_A$ falls within the range of 10–85 but does not fall within the range of 45–55 and wherein $C_A$, $n_A$ and $n_B$ satisfy the following condition:

$$4 \times 10^{-3} \times C_A - 1.7 \leq \log(n_A/n_B) \leq 4 \times 10^{-3} \times C_A - 1.3.$$

2. A composition according to claim 1, wherein $C_A$ is in the range of 20–80.

3. A composition according to claim 1, wherein $C_A$ is in the range of 30–75.

4. A biodegradable plastic shaped body formed of a composition according to claim 1.

5. A biodegradable composition according to claim 1 in the form of a homogeneous melt.

* * * * *

UNITED STATES PATENT AND TRADEMARK OFFICE
CERTIFICATE OF CORRECTION

PATENT NO. : 5,401,778
DATED : March 28, 1995
INVENTOR(S) : TOKIWA et al

It is certified that error appears in the above-indentified patent and that said Letters Patent is hereby corrected as shown below:

Col. 3, lines 5 and 6, "$4 \times 10^{-3} \times C_A - 1.7 \log (n_A/n_B) \leq 4 \times 10^{-3}{}_{33} C_A - 1.3$" should read --$4 \times 10^{-3} \times C_A - 1.7 \leq \log (n_A/n_B) \leq 4 \times 10^{-3} \times C_A - 1.3$--.

Col. 4, line 30, "CS-183 TI" should read --CS-183TI--.

Col. 8, line 61, "used°" should read --used.--.

Signed and Sealed this

Nineteenth Day of September, 1995

*Attest:*

BRUCE LEHMAN

*Attesting Officer*     *Commissioner of Patents and Trademarks*